Aug. 14, 1934.  L. O. FRENCH  1,969,742
ELECTROMAGNETIC VALVE
Filed Feb. 27, 1932
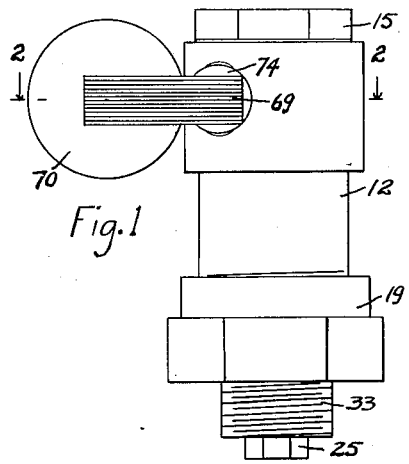
Fig.1
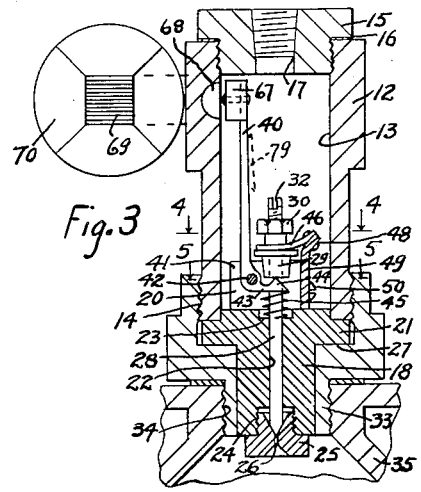
Fig.3
Fig.8  Fig.6  Fig.2
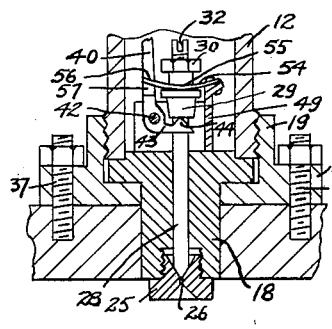 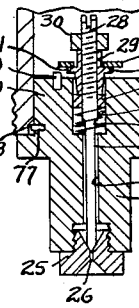 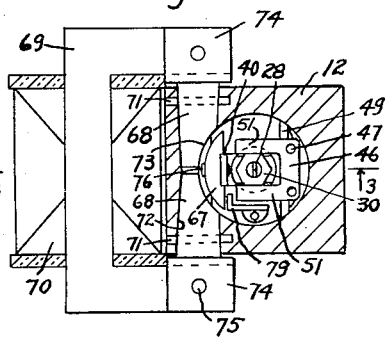
Fig.10  Fig.11  Fig.5  Fig.4
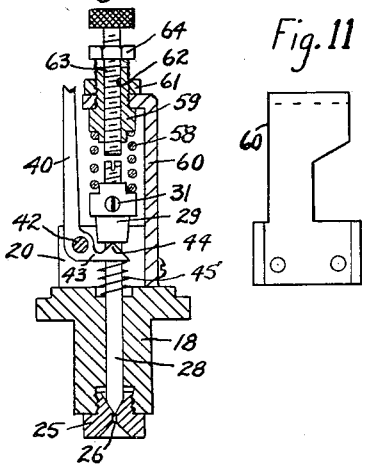 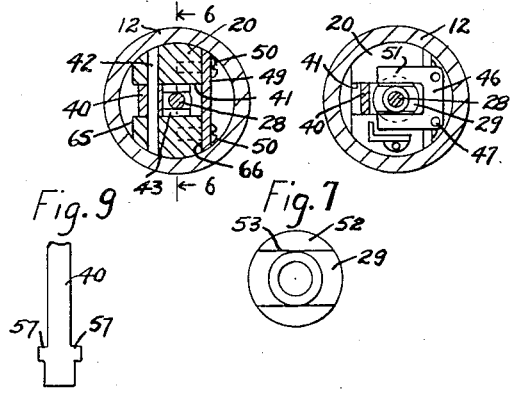
Fig.9  Fig.7
INVENTOR
Louis O. French Patented Aug. 14, 1934

1,969,742

UNITED STATES PATENT OFFICE 1,969,742

ELECTROMAGNETIC VALVE

Louis O. French, Milwaukee, Wis.

Application February 27, 1932, Serial No. 595,501

14 Claims. (Cl. 137—139)

The invention relates to electromagnetically-operated valves, and more particularly to an electromagnetic valve suitable for use in the fuel feeding or fuel injection systems of internal combustion engines to control directly or indirectly the fuel supplied to such engines.

Electromagnetic valves of the type above set forth to meet conditions exacted in service have to be capable of very fast operation, fine and accurate adjustment and in the case of fuel injection systems, operate under high pressure. The valve of the present invention satisfies these requirements and is an improvement over the valve shown in my prior application Ser. No. 477,489 filed August 25, 1930 in that the whole structure is rendered more compact, the parts may be made smaller and their inertia thereby reduced; the valve and its operating lever may be assembled together and removed as a unit and the number of joints to seal against possible escape of fluid have been reduced.

A further object of the invention is to provide an electromagnetic valve in which the operating lever for the valve is mounted on a removable casing member forming the guide for the valve and has a part extending in a direction substantially lengthwise of the valve, the casing member forming the guide for the valve also preferably having the valve seat member connected thereto and relative to these features the present application is a continuation in part of my prior application Ser. No. 542,485 filed June 6, 1931.

In connection with fuel metering valves for engines of small bore the orifice controlled by the valves are very small and in using a needle valve, unless the valve is accurately guided, the needle tends to score the seat and one of the objects of the present invention is to provide a construction in which the needle valve guide extends to a position adjacent the seat and the closing spring acts upon the upper end of the valve.

A further object of the invention is to provide a construction in which the weight of the moving parts may be reduced to a very small amount by the arrangement hereinafter described.

A further object of the invention is to provide a very compact valve construction in which the closing of the valve may be accomplished by a flat spring, which preferably may also act in conjunction with parts of the valve to facilitate its adjustment, and further to provide an arrangement whereby the same spring that closes the valve may also be used to maintain the engagement between the valve and its operating lever so as to take up all lost motion and permit the extremely small lifts that may be required in service.

The invention further consists in the several features hereinafter set forth and more particularly defined by claims at the conclusion hereof.

In the drawing, Fig. 1 is a side elevation view of a valve embodying the invention;

Fig. 2 is a detail sectional view taken on the line 2—2 of Fig. 1;

Fig. 3 is a detail sectional view taken on the line 3—3 of Fig. 2;

Fig. 4 is a detail sectional view taken on the line 4—4 of Fig. 3;

Fig. 5 is a detail sectional view taken on the line 5—5 of Fig. 3;

Fig. 6 is a detail sectional view taken on the line 6—6 of Fig. 5;

Fig. 7 is an enlarged plan view of one of the valve parts;

Fig. 8 is a detail sectional view similar to Fig. 3, showing certain modifications, parts being broken away;

Fig. 9 is a detail side elevation view of part of the operating lever of Fig. 8;

Fig. 10 is a detail vertical sectional view of the valve assembly showing certain modifications;

Fig. 11 is a detail side view of the bracket shown in Fig. 10.

Referring to the drawing, the numeral 12 designates a casing member of suitable non-magnetic material, such as bronze or Monel metal, having a longitudinally extending passage 13 threaded at its upper end and having an external thread 14 at its lower end. A plug or cap nut 15 engages the upper threaded end of the passage 13 and has a shoulder engaging a gasket 16 between it and the upper part of the member 12 to provide a sealed joint. This cap has a centrally disposed opening 17 threaded to receive a pipe for connection either with a source of fluid supply or place of use.

The casing also includes the metal member 18 secured to the member 12 by a clamping nut 19.

The member 18 has an extension 20 fitting in the lower end of the passage 13, an annular flange 21, and a body portion provided with a centrally-disposed guide bore 22 which communicates at one end with a spring recess 23 and at the other end with a bore 24 threaded to receive a valve seat member 25 provided with a passage 26.

The flange 21 has either a carefully ground fit with the lower end of the member 12 to seal the joint between the same or a suitable sealing gasket like the gasket 16 may be interposed between these parts and a similar joint is made between this flange 21 and the adjacent annular flange 27 of the nut 19, which engages the thread 14 to firmly clamp the casing members together.

A needle valve 28 has its stem slidably guided in the bore 22 and seats on the member 25 and controls the flow of fluid through the passage 26. The upper end of the stem is threaded to receive a correspondingly threaded adjustable stop or nut member 29 which may be held in adjusted position in various ways, as for example by the lock nut 30 shown in Figs. 3, 6 and 8 or the set screw 31 shown in Fig. 10 and the upper end of the stem may have a kerf 32 therein to receive a screw driver or other suitable tool for holding or turning the valve relative to the nut member 29. The valve is normally held to its seat or in a closed position by spring means hereinafter described.

Where the valve is used as a fuel injector valve I have shown the nut 19, in Figs. 1 and 3, provided with a threaded tubular end 33 engaging in a threaded bore 34 in the engine cylinder 35 or said nut may have flanges 36 apertured to receive studs 37 clamping it to the cylinder as shown in Fig. 8. In either case when the valve opens, fuel introduced into the casing will flow through the same including the working clearance space of the bore 22 or one or more flats 39 on the member 28 and through the passage 26 into the engine cylinder, though it will be understood that the valve may control passage of fluid into as well as out of the casing and is not to be limited only to use as a fuel injector.

A multiplying lever 40 is mounted to work in the casing section 12 with its lower end guided by the sides of a transverse slot 41 formed in the extension 20 of the member 18 and supported on a pivot pin 42 mounted in said extension. This lever has bifurcations 43 having pointed ends 44 engaging a stop on the valve stem here formed by the stop member 29 whose tapered lower end projects into the slot 41. The lever in the forms shown in Figs. 3 and 10 is constantly held in engagement with said stop member so as to take up all lost motion between it and the valve by a spring 45 seated in the recess 23 and engaging the bifurcations 43, it being noted that in a valve of this kind the lift of the valve may be within the range of one hundredth to one half a thousandth of an inch.

Referring to Figs. 2, 3 and 6 the spring means to close the valve comprises a spring 46 of flat spring stock secured as by rivets 47, to the upper angled end 48 of a metal bracket 49 secured to the member 18 as by screws 50, said spring preferably having bifurcations 51 which straddle the valve stem and engage diametrically disposed flats 52 formed on the stop member 29 which act similarly disposed sides 53 which act as wrench or other tool-engaging surfaces for turning or holding said stop member and which while normally spaced a short distance from the inner sides of the bifurcations 51 may be engaged thereby by a slight turning movement so that the spring 46 may then act as a wrench to hold said nut member when under some conditions it is desirable to adjust the valve while in assembled position. The tension of this spring exceeds that of the spring 45 and its tension may be adjusted either by shims under its nut engaging parts or by varying the angularity of the bracket end 48 relative to the valve.

In the form shown in Fig. 8 a single spring 54 is used to both hold the valve in normally closed position and the lever 40 in engagement with the valve and in this instance this spring has bifurcations 55, similar to the bifurcations 51 and similarly associated with the nut member 29, and these bifurcations have extensions 56 which engage inclined shoulders or projections 57 on the operating lever so as to exert a force thereon tending to swing the forked end of said lever into engagement with the stop 29, the arrangement being such that the force exerted by the spring on the lever is less than that of said spring on the valve.

In the form shown in Fig. 10 a coiled spring 58 is interposed between the nut 29 and a tension adjusting nut 59 adjustably mounted in a suitable bracket 60 secured to the member 18 and locked in adjusted position by a lock nut 61, said nut 59 having a central opening 62 therein for the introduction of a small screw driver to turn the valve for adjustment purposes if desired, this opening being here shown as threaded to receive an adjustable stop rod 63, engageable with the upper end of the valve to limit its lift, and held in adjusted position by a lock nut 64.

In each instance it will be noted that the valve and its operating lever and the spring means associated therewith forming the whole valve assembly is mounted on the member 18 and removable therewith as a unit from the casing member 12 and that the valve may be ground to its seat in the member 25 while separated from the member 12, it being noted that the extension 20 has the flats 65 and 66 formed on it and that the brackets 49 and 60 have flat sides so that this assembly may be engaged by a wrench or held in a vise when removed from the casing member 12 so that the nozzle or seat member may be removed under these conditions.

The longer arm of the lever 40 extends at one side of the valve and generally lengthwise thereof and of the passage 13 and has an armature 67 of soft iron or steel riveted or otherwise suitably secured to the upper end thereof which cooperates with an electromagnet that has a pole portion in the casing member 12. The preferred construction of operating electromagnets is one in which pole pieces 68 have fluid tight engagement with the casing and a soft iron core 69 secured thereto carries a suitably insulated energizing coil 70.

The pole pieces 68 are in the form of tapered pins carefully fitted and locked, by pins 71, in correspondingly tapered oppositely disposed bores 72 in the casing 12 and spaced from each other at their inner ends which are finished to the curvature of the bore 13 to provide pole faces 73 to cooperate with the correspondingly curved face of the armature 67 and have enlarged heads 74 outside the casing slotted to receive the U-shaped core 69 which is secured thereto by rivets 75, said core preferably being made up of a number of laminations. The core may extend at any desired angle relative to the casing within a radius of over one hundred and eighty degrees.

The end 76 of the rivet of non-magnetic material securing the armature to the lever may extend slightly beyond the same to prevent freezing when direct current is used and may also form a stop to limit the inward swinging movement of the lever as shown in Fig. 3 or the stop rod 63 shown in Fig. 10 may be used in any of the forms for this purpose.

To prevent the member 18 from being rotated and to hold it in a position to aline the armature 67 with the pole faces a key connection such as the pin 77 in the part 20 engaging a groove 78 in the lower end of the casing 12, see Fig. 6, may be used. As the lift of the valve depends upon the swing of the lever 40, it is essential that the limits of swing of this lever be accurately determined. As has been noted above, the engagement of end 76 of the armature with the poles or the valve with the rod 63 limits the outward position of the lever. The adjustment of the stop member 29 on the valve stem limits the inward position of the lever when the valve is closed. As an aid in providing for a uniform adjustment for a plurality of valves, each valve assembly may have an indicator such as the pointer or gauge member 79 mounted on the member 18 and cooperating with the upper end of the lever to aline therewith in its predetermined adjusted position, or a pin 80 may be mounted in the member 18 adjacent the lower side of the flange portion 81 of the nut 29 to aline therewith when the lever is in the position to lift the valve the desired amount. The above mentioned gauges permit of the adjustment of the lift of the valves outside of their casings though the valves may also be adjusted when assembled in the casings if desired.

In any of the above described constructions when the coil 70 of the electromagnet is energized, the armature 67 will be attracted toward the pole faces 52 of the magnet and thus move the lever 40 so that the forks 43 acting through the stop 29 serve to raise or open the valve 28. Owing to the fact that the distances through which the longer arm of the lever moves may be made very small and the leverage may be five or ten or more to one, the actual lift of the valve may be made extremely small so that very small quantities of fuel may be handled even though this fuel be at pressures of three thousand pounds per square inch or more and this leverage also reduces the work of the electromagnet, so that small relatively light duty electromagnets capable of operating at high speed with low current expenditures may be used and this cuts down or substantially eliminates destructive arcing at the switch terminals of the control for the magnet. Furthermore, as the shorter arm of the lever is disposed at an angle to the longer arm and preferably at substantially right angles, the length of the casing is practically determined by the length of the longer arm and the parts may be compactly arranged. Also the actuating lever and the valve are free to move within the liquid in the enclosing casing and by the use of the spring means herein described the lever 40 is held in a position to engage the stop member 29 to facilitate the adjustment, take up lost motion and, in the case of an opposing closing spring, enable a heavier and livelier closing spring to be used since the springs tend to oppose each other. Also the whole valve assembly may be removed from the casing section 12 and serviced as a unit.

It is also to be noted that the seat 25 for the valve is at the end of the guide so that accurate centering of the valve is insured and that the closing spring acts on that portion of the stem that projects above the guide and as this portion is relatively short the valve stem length need not be much greater than the length of its guide so that the overall length of the valve may, in the case of small high speed engines, be short and this reduces the weight of the moving parts and hence permits of a quick opening and closing movement of the valve. In the case of the form shown in Fig. 8 it will be noted that, as the lever 40 lifts the valve against the action of the spring 54, this spring moves or tends to move away from its engagement with the lever 40 but since under the conditions the initial engagement of the lever 40 with the valve has been maintained any lost motion has been taken up so that the spring 54 insures the operative engagement between said lever and valve and prevents play between these parts.

I desire it to be understood that this invention is not to be limited to any particular form or arrangement of parts except in so far as such limitations are included in the claims.

What I claim as my invention is:

1. In an electromagnetically-operated valve, the combination of a fluid containing casing comprising casing members detachably secured together to provide a fluid tight casing and having communicating longitudinally extending passages, a valve mounted in said passages and controlling the passage of fluid therethrough, one of said casing members having a seat for said valve and a valve guide portion, a multiplying lever pivotally supported by said last named casing member and having one arm operatively connected to the valve and its other arm extending substantially lengthwise of the valve in the passage of the other casing member and provided with an armature, spring means to close the valve, said lever and spring means being carried by said first named casing member and removable therewith as a unit from the other casing member, and an electromagnet having a pole portion disposed in the wall of said casing in operative relation with said armature.

2. In an electromagnetically-operated valve, the combination of a valve unit comprising a casing section having a valve guide portion and a valve seat, a valve working in said guide portion and controlling the flow of fluid past said seat, a multiplying lever pivotally supported on said casing section and having a short arm operatively connected to said valve and a longer arm provided with an armature, spring means to close the valve and means to prevent play between said lever and valve, and a casing section having a passage in which that part of said unit carrying the lever is disposed, an electromagnet having a pole portion mounted in said last named casing section in operative relation with said armature, and means for connecting said casing sections together in fluid tight relation.

3. In an electromagnetically-operated valve, the combination of a fluid containing casing, a control valve working in said casing and controlling the passage of fluid therethrough, a part of said casing having a valve guide portion and a slotted portion adjacent said guide portion, a multiplying lever pivotally mounted in said slotted portion and having one arm operatively connected to said valve and its other arm extending adjacent one side of said valve, a spring between said guide portion and lever to prevent play between said lever and valve, means to close the valve, an armature operatively connected to the last named arm of said lever, and an electromagnet having a pole portion mounted in said casing in operative relation with said armature.

4. In an electromagnetically-operated valve, the combination of a casing including a casing member having a valve guide portion and a slotted portion, a multiplying lever pivotally mounted to work in said slotted portion and having a long arm and a short arm, an armature on the long arm of said lever, a second casing member surrounding said slotted portion and said lever and having fluid tight connection with said first named casing member, an electromagnet having a pole portion mounted in said second casing member in operative relation to said armature, a valve having its stem slidably mounted in said guide portion and controlling the passage of fluid through said casing and provided with a stop engaged by the short arm of said lever, and a spring to close said valve.

5. In an electromagnetically-operated valve, the combination of a casing comprising separate contiguous casing members detachably secured together to provide a fluid tight casing with a longitudinally extending passage, a valve mounted in said passage and controlling the passage of fluid therethrough, a multiplying lever pivotally mounted to work wholly within said casing and having one arm operatively connected to said valve and its other arm extending alongside the stem of said valve, one of said casing members projecting into another of said casing members and providing a support for said lever and a guide for said valve, spring means on last named casing member to close said valve, an armature associated with the last named arm of said lever, and an operating electromagnet having a pole portion disposed in said casing in operative relation to said armature.

6. In an electromagnetically-operated valve, the combination of a fluid containing casing, an inwardly opening control valve working in said casing and controlling the passage of fluid therethrough, a multiplying lever mounted to work in said casing and operatively connected to said valve and provided with an armature, a single spring means to close said valve and also prevent play between said lever and valve, and an operating electromagnet having a pole portion disposed in said casing in operative relation to said armature.

7. In an electromagnetically-operated valve, the combination of a valve unit including a casing member provided with a valve guide portion and a seat at one end of said guide portion, a needle valve slidably mounted in said guide portion and controlling passage of fluid past said seat and having its stem projecting beyond said guide portion, a multiplying lever pivotally mounted on said casing member and engageable with the projecting stem of said valve and provided with an armature, and spring means carried by said member and engageable with that portion of the valve projecting beyond said guide portion to close the valve, a casing section enclosing that part of the unit having said lever and spring means mounted thereon and removably connected with the casing member of said unit, and an electromagnet having a pole portion disposed in said last named casing section in operative relation to said armature.

8. In an electromagnetically-operated valve, the combination of a valve unit including a casing member provided with a valve guide portion and a seat, an inwardly opening valve working in said guide portion and controlling the passage of fluid past said seat and having its stem projecting beyond said guide portion, a multiplying lever operatively connected with said valve and provided with an armature, means to take up play in the connection between said lever and valve, a spring for closing the valve having one end engageable with the valve, and a support for the other end of the spring detachably secured to said casing member, a casing section enclosing that part of the unit having said lever and spring mounted thereon and removably connected with the casing member of said unit, and an electromagnet having a pole portion disposed in said last named casing section in operative relation to said armature.

9. In an electromagnetically-operated valve, the combination of a valve unit including a casing member provided with a valve guide portion and a seat, a needle valve working in said guide portion and controlling the passage of fluid past said seat and having a part projecting beyond said guide portion, a flat spring mounted on said casing member and engageable with the projecting part of the valve to close the valve, and a multiplying lever pivotally mounted on said casing member and engageable with the projecting part of the valve and provided with an armature, a casing section enclosing that part of the unit having said lever and spring mounted thereon and removably connected with the casing member of the unit, and an electromagnet having a pole portion disposed in said last named casing section in operative relation to said armature.

10. In an electromagnetically-operated valve, the combination of a valve unit including a casing member provided with a valve guide portion and a seat, a valve working in said guide portion and controlling the passage of fluid past said seat and having a part projecting beyond said guide portion, a flat spring mounted on said casing member and provided with bifurcations engageable with the projecting part if the valve to close the valve, and a multiplying lever pivotally mounted on said casing member and engageable with the valve and provided with an armature, a casing section enclosing that part of the unit having said lever and spring mounted thereon and removably connected with the casing member of the unit, and an electromagnet having a pole portion disposed in said last named casing section in operative relation to said armature.

11. In an electromagnetically-operated valve, the combination of a valve unit including a casing member provided with a valve guide portion and a seat, a needle valve working in said guide portion and controlling the passage of fluid past said seat and having a part projecting beyond said guide portion, a multiplying lever pivotally mounted on said casing member and engageable with the valve and provided with an armature, and a flat spring carried by said casing member engageable with the valve to close the same and operatively connected with said lever to take up play between said lever and valve, a casing section enclosing that part of the unit having said lever and spring mounted thereon and removably connected with the casing member of the unit, and an electromagnet having a pole portion disposed in said last named casing section in operative relation to said armature.

12. In an electromagnetically-operated valve, the combination of a valve unit including a casing means provided with a valve guide portion and a seat, a valve working in said guide portion and controlling the passage of fluid past said seat, said valve provided with an adjustable stop, means to close the valve, a multiplying lever mounted on said casing means and having a short arm engageable with said stop and a long arm provided with an armature, and means for assisting the operator in adjusting the relation of said stop and lever for regulating the lift of the valve, a separate casing member enclosing that part of said unit having the lever mounted thereon, and an electromagnet having a pole portion disposed in said last named casing member in operative relation to said armature.

13. An electromagnetically-operated valve as specified in claim 10 wherein the bifurcations of the spring engage a stop member adjustably mounted on the stem of the valve and act as a wrench in the adjustment of said stop member relative to the valve stem.

14. An electromagnetically-operated valve as specified in claim 11 wherein the flat spring is bifurcated with its bifurcated portions engaging both the valve and the lever.

LOUIS O. FRENCH.

CERTIFICATE OF CORRECTION.

Patent No. 1,969,742.　　　　　　　　　　　　　　　　　August 14, 1934.

LOUIS O. FRENCH.

It is hereby certified that error appears in the printed specification of the above numbered patent requiring correction as follows: Page 1, line 103, before "recess" insert seat; page 2, line 29, before the syllable "mem-" insert valve; page 4, line 110, claim 10, for "if" read of; and that the said Letters Patent should be read with these corrections therein that the same may conform to the record of the case in the Patent Office.

Signed and sealed this 11th day of September, A. D. 1934.

Leslie Frazer (Seal)　　　　　　　　　　　　　　　　　Acting Commissioner of Patents.